July 31, 1962 R. C. BUCK 3,046,646
TOOL FOR REMOVING WINDSHIELD WIPER ARMS
Filed Sept. 6, 1960

INVENTOR.
Robert C. Buck
BY
Hovey, Schmidt, Johnson & Hovey
ATTORNEYS.

United States Patent Office 3,046,646
Patented July 31, 1962

3,046,646
TOOL FOR REMOVING WINDSHIELD
WIPER ARMS
Robert C. Buck, 9901 E. 18th St., Independence, Mo.
Filed Sept. 6, 1960, Ser. No. 54,030
1 Claim. (Cl. 29—278)

The present invention relates to a tool for holding and removing windshield wiper arm assemblies from the posts upon which they are mounted on an automobile or the like, and more particularly, the present invention relates to a tool especially designed to hold a windshield wiper arm assembly wherein the wiper arm is provided with portions continuously biased toward disposition in angular relationship.

It is an object of the present invention to provide a simple and inexpensively constructed tool for engaging a windshield wiper arm assembly having portions biased toward disposition in angular relationship, so that the assembly may be easily removed and replaced on the oscillating post on the automobile provided for connection therewith.

It is another object of the present invention to provide a tool for engaging the portions of a windshield wiper arm assembly biased toward disposition in angular relationship, wherein the tool is provided with a plurality of hooks coupled with an elongated member so that the assembly may be engaged between the hooks and the elongated member.

It is another object of the present invention to provide a tool for engaging portions of a windshield wiper arm assembly continuously biased toward disposition in angular relationship wherein the tool is provided with a plurality of hooks coupled with an elongated member, and at least one shiftably mounted element on the elongated member so that the tool may be adjusted to fit assemblies of various thicknesses.

It is still another object of the present invention to provide a tool for holding the portions of a windshield wiper arm assembly which are continuously biased toward disposition in angular relationship, wherein the tool includes an elongated member having an integral hook at either end, extending transversely therefrom, and having an element shiftably mounted on said elongated member intermediate the integral hooks and slidable along said member, whereby the tool may be adjusted to handle wiper arm assemblies of various thicknesses.

It is still a further object of the present invention to prjovide a tool for holding the portions of the windshield wiper arm assembly continuously biased toward disposition in angular relationship wherein the tool includes an elongated member having a pair of integral hooks one disposed at either end of the member and extending transversely therefrom, a slidable element shiftably mounted on the elongated member intermediate the integral hooks, and wherein the tool is further provided with handle means extending from the ends of the elongated member so that the tool may be easily grasped by a user.

Further objects and advantages of the present invention will become apparent as the description proceeds and various modifications and changes may be made to the structure described without departing from the spirit of the present invention. Such further objects and modifications and changes are intended to be covered by the scope of the appended claims.

Figure 1:
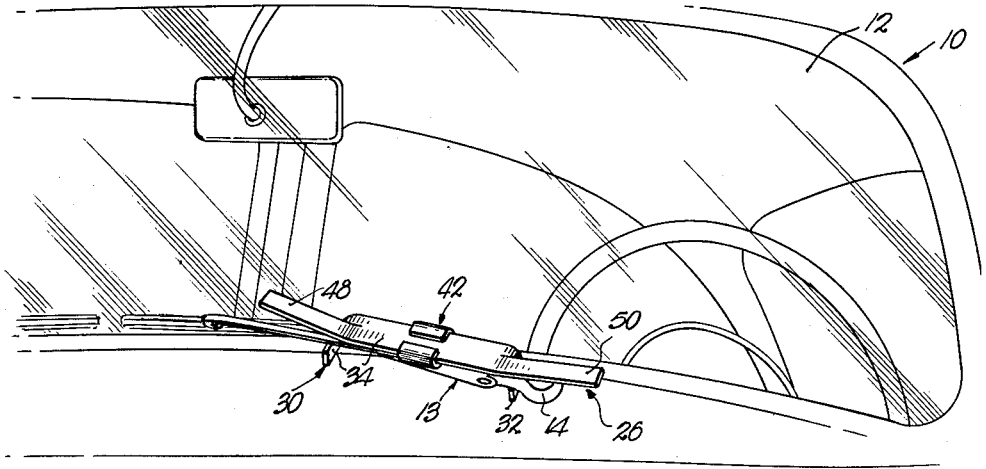
FIGURE 1 is a partial front elevational view of an automobile, showing the windshield wiper arm assembly thereof and a tool embodying the present invention engaged with the assembly.

In FIG. 1 of the drawings, there is illustrated generally, an automobile designated by the numeral 10, and more particularly, the front windshield thereof indicated by the numeral 12. It should be noted at this point that the windshield 12 is of the type generally known as a "wrap-around" windshield for purposes of providing the driver of an automobile with an unobstructed view to the front and sides of the automobile.

With the advent of the wrap-around windshield, it has become necessary to provide a windshield wiper arm assembly 13, consisting of a pair of pivotally connected portions generally designated in the drawing by the numerals 14 and 16, which are continuously biased such as by the spring assembly 18 toward disposition in an angular relationship. Such construction is necessary to maintain sufficient pressure upon the blade of the wiper to keep it in full engagement with the curved glass of a wrap-around windshield such as that designated by the numeral 12.

In addition, the construction of the windshield 12 as referred to above, has required windshield wiper arm assemblies 13 of sufficient length to clean a large area of the glass and, therefore, the positioning of the assemblies must be co-ordinated such that the assembly of one side does not interfere with the wiping action of the assembly on the other side. In order to properly offset the positions of the two assemblies so that they do not interfere with each other, a post 20 is provided for each assembly 13 having a splined end portion 22. The portion 14 of the wiper arm assembly 13 is provided with a splined recess 24, and it is manifest from the illustration, that there are a large number of positions of possible engagement between the assembly portion 14 and the splined end portion 22.

For purposes of adjusting the relative positions of two assemblies on the same automobile where it is necessary to remove an assembly from the splined portion 22 of post 20, or when repairs, changes of wiper blades, or other reasons demand that the assembly be removed, a tool generally designated by the numeral 26, is required. Without the provision of tool 26, the bias between portions 14 and 16 created by spring assembly 18, would be so strong as to render it difficult, if not impossible, to easily remove and replace a windshield wiper arm assembly. Manifestly, if the position of the assembly upon an automobile can be maintained, the assembly may be handled in the easiest manner for removal and replacement upon the splined portion 22 of post 20.

Figure 2:
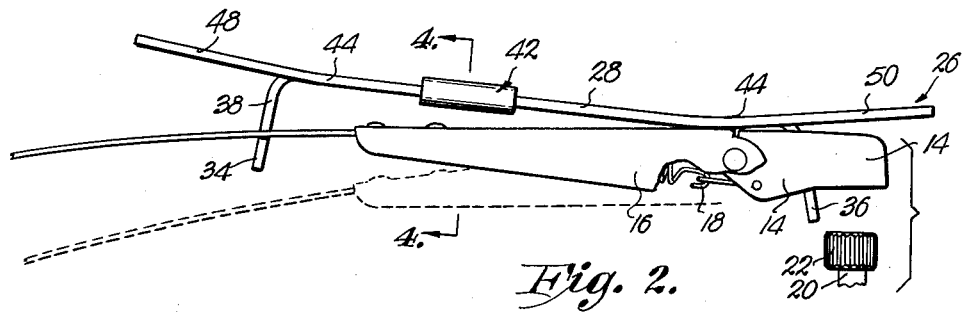
FIG. 2 is an exploded, side elevational view of a windshield wiper arm assembly and the post to which it is attached, and a side view of a tool embodying the present invention in engagement with the assembly, the assembly having portions broken away to show details of construction.

Tool 26 of the present invention, includes an elongated, central portion 28 having an integral pair of L-shaped hooks 30 and 32, one of which is disposed at each end of elongated member 28. The hooks 30 and 32 extend in such a manner that the stems 34 and 36 are laterally spaced from central portion 28, while the foot portions 38 and 40 position the stems 34 and 36 in the spaced relation described over portions of one face of central portion 28. Central portion 28 is provided with bends or fulcrum points 44 adjacent to hooks 30 and 32 for the purpose of engaging the joint between portions 14 and 16 behind the pivotal connection thereof as illustrated in FIG. 2 of the drawing.

It will be seen from the structure described, that if the hooks 30 and 32 are slipped over the portions 14 and 16 of the wiper arm assembly 13 from the top, in the manner disclosed in FIG. 1, the portions 14 and 16 will be confined and held between the hooks 30 and 32 and one of the fulcrum points 44 of central portion 28 of tool 26. The tool may then be used to remove the assembly without permitting the same to buckle under the influence of spring assembly 18.

Since some of the wiper arm assemblies vary in thickness, a slidable element 42 is provided on central portion 28 of tool 26. Element 42 may be shifted on the central portion 28 of tool 26, and positioned as desired at any point along central portion 28 intermediate hooks 30 and 32 to shim up either of the fulcrum points 44 of tool 26 whereby the latter may be used with assemblies of various thicknesses.

A pair of integral, elongated handle portions 48 and 50 are provided, one extending longitudinally from each end of central portion 28 of tool 26. As is particularly well illustrated in FIG. 2, the handle portions 48 and 50 are inclined relative to central portion 28 as a result of bends 44 in a direction opposite to that in which the hooks 30 and 32 extend from central member 28. Handle members 48 and 50 render tool 26 easy to grasp by the hands of a user.

Figure 3:
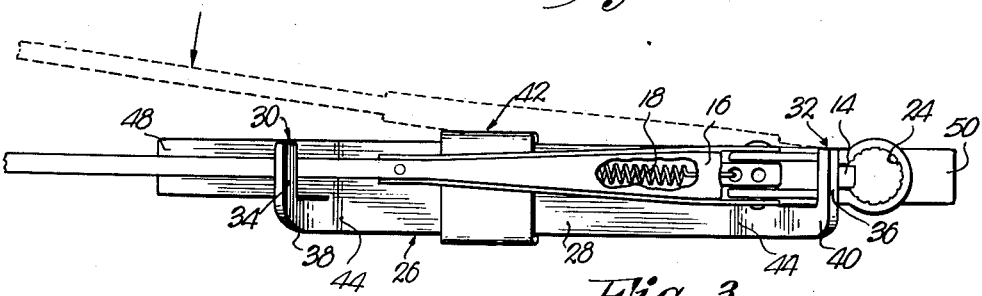
FIG. 3 is a bottom view of a windshield wiper arm assembly and of a tool embodying the present invention, engaged with said assembly, the assembly having parts broken away to show details of construction.
Figure 4:
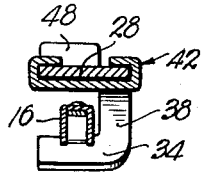
FIG. 4 is a transverse, cross-sectional view taken along line 4—4 of FIG. 2, looking in the direction of the arrows.

Referring particularly to FIGS. 2 and 3 of the drawing, the dotted line positions of the windshield wiper arm assembly 13 indicate generally, how the same may be easily manipulated into and out of engagement with the hooks 30 and 32 by moving the same with the thumb into and out of the slot created between the stems 34 and 36 and central portion 28 of tool 26 when a fulcrum point 44 is behind the pivotal connection between portions 14 and 16 to brace the portions against pivotal movement.

Having thus described the invention, what is claimed as new and desired to be secured by Letters Patent is:

A tool for holding a windshield wiper arm assembly having a pair of swingably interconnected portions continuously biased toward disposition in angular relationship, said tool including an elongated member having a fulcrum point bend adjacent each end thereof; a pair of spaced, L-shaped, stationary hooks integral with said member and disposed one at each end of said member, said stationary hooks extending transversely from said member for holding said portions of said assembly between one of said fulcrum point bends and said stationary hooks against the continuous bias of said portions toward disposition in angular relationship; at least one movable fulcrum element shiftably mounted on said member intermediate said stationary hooks for adjustable positioning between said stationary hooks for adjusting the fulcrum point of said tool for use on assemblies of various thicknesses; and handles integral with said member and extending longitudinally therefrom permitting said tool to be easily grasped by the user.

References Cited in the file of this patent

UNITED STATES PATENTS

| Re. 16,470 | Stanley et al. | Nov. 9, 1926 |
| 270,069 | Hudson | Jan. 2, 1883 |
| 747,101 | Terry | Dec. 15, 1903 |
| 1,415,440 | Grein | May 9, 1922 |
| 2,921,368 | De Lucia | Jan. 19, 1960 |

FOREIGN PATENTS

| 777,805 | France | Dec. 5, 1934 |